(12) United States Patent  
Mendenhall et al.

(10) Patent No.: US 7,301,608 B1  
(45) Date of Patent: Nov. 27, 2007

(54) PHOTON-COUNTING, NON-IMAGING, DIRECT-DETECT LADAR

(75) Inventors: Scott N. Mendenhall, Fort Wayne, IN (US); Peter J. Wheel, Fort Wayne, IN (US); Michael W. Millard, Arlington, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 332 days.

(21) Appl. No.: 11/032,911

(22) Filed: Jan. 11, 2005

(51) Int. Cl.  
*G01C 3/08* (2006.01)

(52) U.S. Cl. ..................... 356/4.01; 356/4.1
(58) Field of Classification Search ............... 356/4.01  
See application file for complete search history.

(56) References Cited

U.S. PATENT DOCUMENTS

| | | |
|---|---|---|
| 5,136,421 A | 8/1992 | Sagan |
| 5,241,315 A | 8/1993 | Spinhirne |
| 5,809,397 A | 9/1998 | Harthcock et al. |
| 5,892,575 A * | 4/1999 | Marino ............. 356/5.01 |
| 5,953,110 A | 9/1999 | Burns |
| 6,049,720 A | 4/2000 | Rude |
| 6,141,335 A | 10/2000 | Kuwahara et al. |
| 6,161,023 A | 12/2000 | Johnson et al. |
| 6,218,657 B1 | 4/2001 | Bethune et al. |
| 6,298,248 B1 | 10/2001 | Miyoshi et al. |
| 6,384,663 B2 | 5/2002 | Cova et al. |
| 6,433,860 B1 | 8/2002 | Ohishi |
| 6,456,610 B1 | 9/2002 | Briley |
| 6,476,396 B1 | 11/2002 | Forsyth |
| 6,546,254 B2 | 4/2003 | Fitzgerald |
| 6,720,588 B2 | 4/2004 | Vickers |
| 6,723,975 B2 | 4/2004 | Saccomanno |
| 6,741,341 B2 | 5/2004 | DeFlumere |
| 2002/0171897 A1 | 11/2002 | Cho et al. |
| 2003/0058450 A1 | 3/2003 | Mosley et al. |

* cited by examiner

*Primary Examiner*—Thomas H. Tarcza  
*Assistant Examiner*—Luke D. Ratcliffe  
(74) *Attorney, Agent, or Firm*—RatnerPrestia

(57) ABSTRACT

A light wave rangefinder includes a light transmitting optical system for directing a laser pulse at a target, and a light receiving optical system for receiving reflected light from the target, including a Geiger-mode avalanche photodiode (APD) array and a non-imaging optical device. The non-imaging optical device is positioned between the received reflected light and the APD array, and is configured to uniformly distribute the received reflected light across the APD array. The APD array is uniformly illuminated by a single received reflected laser pulse, producing a plurality of Geiger-mode avalanche events.

20 Claims, 9 Drawing Sheets b = background photon count
d = dark count
s = signal photon count

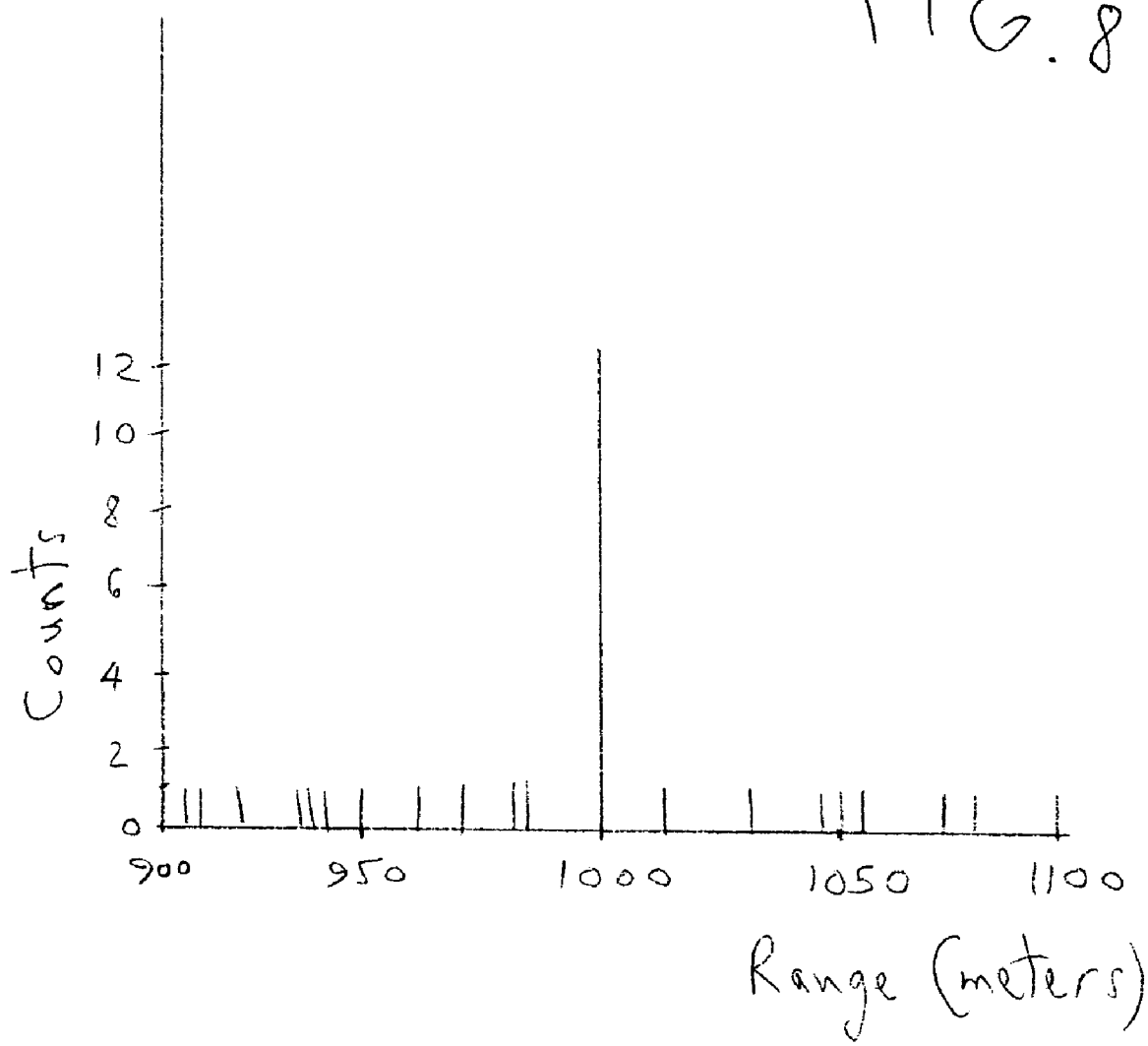

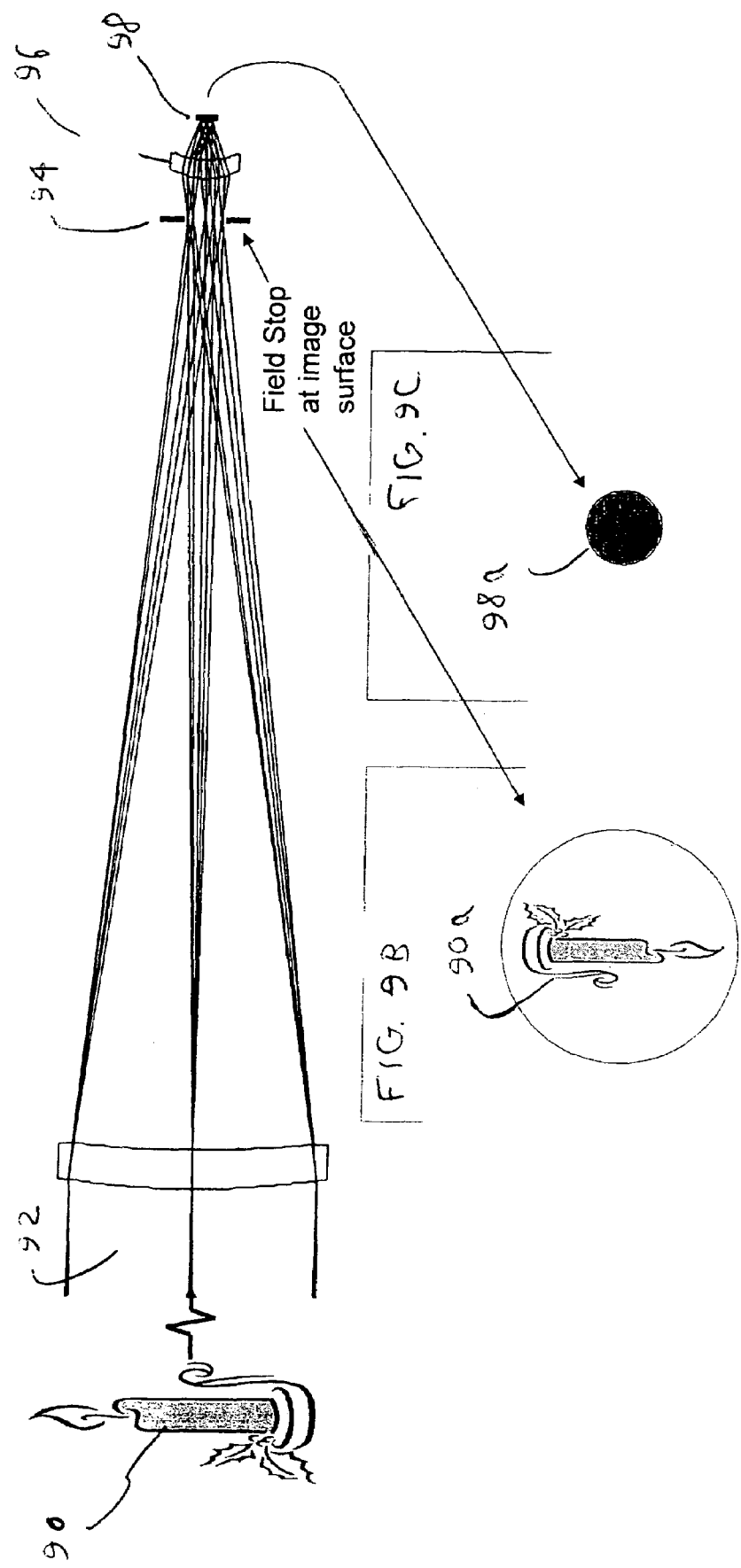

PHOTON-COUNTING, NON-IMAGING, DIRECT-DETECT LADAR

TECHNICAL FIELD

The present invention relates, in general, to a method and apparatus for ranging to a target using a laser detection and ranging (LADAR) system. More specifically, the present invention relates to a LADAR system for determining range to a target, using a Geiger-mode avalanche photodiode (APD) detector array with a non-imaging optical device that evenly distributes reflected light from the target onto the APD detector array.

BACKGROUND OF THE INVENTION

Laser radar, also referred to as Light Detection and Ranging (LIDAR) or Laser Detection and Ranging (LADAR), is an active imaging technique which utilizes a laser in a radar system configuration to remotely image a scene and/or range to a target. Laser radar systems utilize principles of optics and microwave radar. Conventional laser radar systems are able to measure the shape, position and velocity of objects in a scene.

Conventional laser radar systems may be broadly divided into two categories: scanning and scannerless. Typical scanning laser radar systems include a laser, scanning optics, a timing system, a light detector system and a processor. To image a target scene, a typical scanning laser radar system first transmits a short pulse of light toward a point in the scene (target). The pulse of light may have a duration of approximately one nanosecond. Next, the detector system detects light reflected back from the point in the scene (target) and the timing system determines the round-trip travel time of the pulse of light.

The "round-trip travel time" of a pulse of light may be defined as the amount of time between the time that the laser transmits the pulse of light and the time that the detector system detects the reflected light. Next, the processor of the scanning laser system records the direction of the output of the laser and the round-trip travel time of the pulse of light. The scanning optics then position the output of the laser toward a new point in the scene and the laser radar system transmits a second pulse. This process is repeated for each point in the target scene. Finally, the processor generates an image of the scene in response to the recorded directions of the output of the laser and the corresponding round-trip travel times of each of the transmitted pulses of light.

Typical scannerless laser radar systems include a laser, a timing system, a stationary detector system and a processor. The detector system may include an array of light detectors. To image a target scene, a scannerless laser radar system directs the output of the laser toward the target scene and the laser transmits a pulse of light toward the target scene which illuminates the entire scene. Next, the detector system detects light reflected back from the scene. The timing system then determines a roundtrip travel time of the pulse of light for each of the light detectors in the array that detects the reflected light. Next, the processor records the positions of the light detectors in the array that detected the reflected light and the corresponding round-trip travel times of the pulse of light for each light detector. Finally, the processor determines an image of the target scene in response to the recorded positions of the light detectors and corresponding round-trip travel times of the transmitted pulse of light.

Generally, for both scanning and scannerless laser radar systems, range determination is made at low signal return levels. Multiple pulses must be processed to obtain an accurate range determination. Multiple pulses are needed to increase the signal to noise ratio of the range measurement, and thus the precision of the measurement. If integration time is critical, and a lesser number of pulses are desired to obtain the range measurement, then the laser radar system must use higher power transmitted pulses. This presents a disadvantage for a laser radar system, since cost of the system goes up with use of a higher power transmitter and higher power components.

Avalanche photodiodes (APDs) are photosensitive devices used to convert optical signals into electrical signals. As such, APDs behave like standard photodiodes, as both APDs and photodiodes convert optical energy into electrical signal. APDs, however, additionally incorporate a gain mechanism internal to the device itself, making it more sensitive. That is, in a conventional p-i-n photodiode an individual photon is converted into one electron-hole pair. In an APD, for each individual photon absorbed, however, multiple electron-hole pairs are generated. This multiplication, however, introduces unwanted noise to the APD's output.

APDs may be operated in two regimes: a linear regime and a breakdown regime, the latter often referred to as the Geiger-mode. In the linear regime, the APD is biased below its breakdown voltage, and the output photocurrent of the APD is proportional to the intensity of light striking the APD absorption region and to the APD gain that occurs in its multiplication region. In the Geiger-mode of operation, the APD is biased above its breakdown voltage. In this mode of operation, a single photon may lead to an avalanche breakdown resulting in a detectable current running through the device, which thereafter remains in a conductive state. Consequently, the amplitude of the output signal in the Geiger-mode is constant and is not proportional to the number of photons absorbed.

U.S. Pat. No. 6,741,341 issued to DeFlumere on May 25, 2004, discloses a laser rangefinder that uses an avalanche photodiode (APD) detector array to determine range to a target. U.S. Pat. No. 5,892,575 issued to Marino on Apr. 6, 1999, discloses a laser rangefinder that uses an avalanche photodiode (APD) detector array to determine range to a target. Neither of these disclosures however, is configured to determine range to a target using a non-imaging device that evenly distributes reflected light from the target due to a single pulse.

The laser rangefinder disclosed by DeFlumere is subject to background noise and must be operated with a very narrow bandpass filter of one nanometer, in order to reduce the background noise. In addition, the disclosed laser rangefinder must be operated together with an IR system that can obtain separate IR image data. Accordingly, the disclosed laser ranger finder is expensive and has a limited capability.

The present invention provides a laser rangefinder that uses an APD detector array operating in a Geiger-mode that does not have the deficiencies of the laser rangefinder disclosed by DeFlumere or Marino.

SUMMARY OF THE INVENTION

To meet this and other needs, and in view of its purposes, the present invention provides a light wave rangefinder having a light transmitting optical system for directing a laser pulse at a target, and a light receiving optical system for receiving reflected light from the target, including a Geiger-mode avalanche photodiode (APD) array, and a non-imaging optical device. The non-imaging optical device is positioned between the received reflected light and the APD array, and is configured to uniformly distribute the received reflected light across the APD array. The APD array is uniformly illuminated by the received reflected laser pulse, producing a plurality of Geiger-mode avalanche events. A processor is also included for determining range to the target based on the plurality of the Geiger-mode avalanche events. The non-imaging optical device may be a pupil imager. The light transmitting optical system directs a single, short laser pulse at the target, and the plurality of Geiger-mode avalanche events is produced by the single, short laser pulse.

Another embodiment of the present invention is a method of determining range to a target. The method includes the steps of: (a) transmitting a laser pulse toward a target; (b) receiving reflected light from the target; (c) uniformly illuminating, in space, reflected light received in step (b) using a non-imaging optical device; (d) detecting the uniformly illuminated light of step (c) using a Geiger-mode avalanche photodiode (APD) array; (e) counting avalanche events produced by a plurality of detectors in the APD array; and (f) determining range to the target based on counting avalanche events in step (e). Step (c) of the method may include uniformly illuminating the reflected light using a pupil imager. The method further includes the step of: dividing a range gate into multiple range bins; and step (d) includes detecting the uniformly illuminated light occurring within the range gate; step (e) includes separately counting the avalanche events occurring in each range bin of the multiple range bins; and step (f) includes determining range to the target based on a range bin having the greatest number of counted avalanche events among the multiple range bins.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 8 is a plot or a histogram of avalanche counts occurring in a detector array as a function of range to a target of interest, in accordance with an embodiment of the present invention; and FIG. 9 is a block diagram of a pupil imager, in accordance with an embodiment of the present invention.

DETAILED DESCRIPTION OF THE INVENTION

Figure 1:
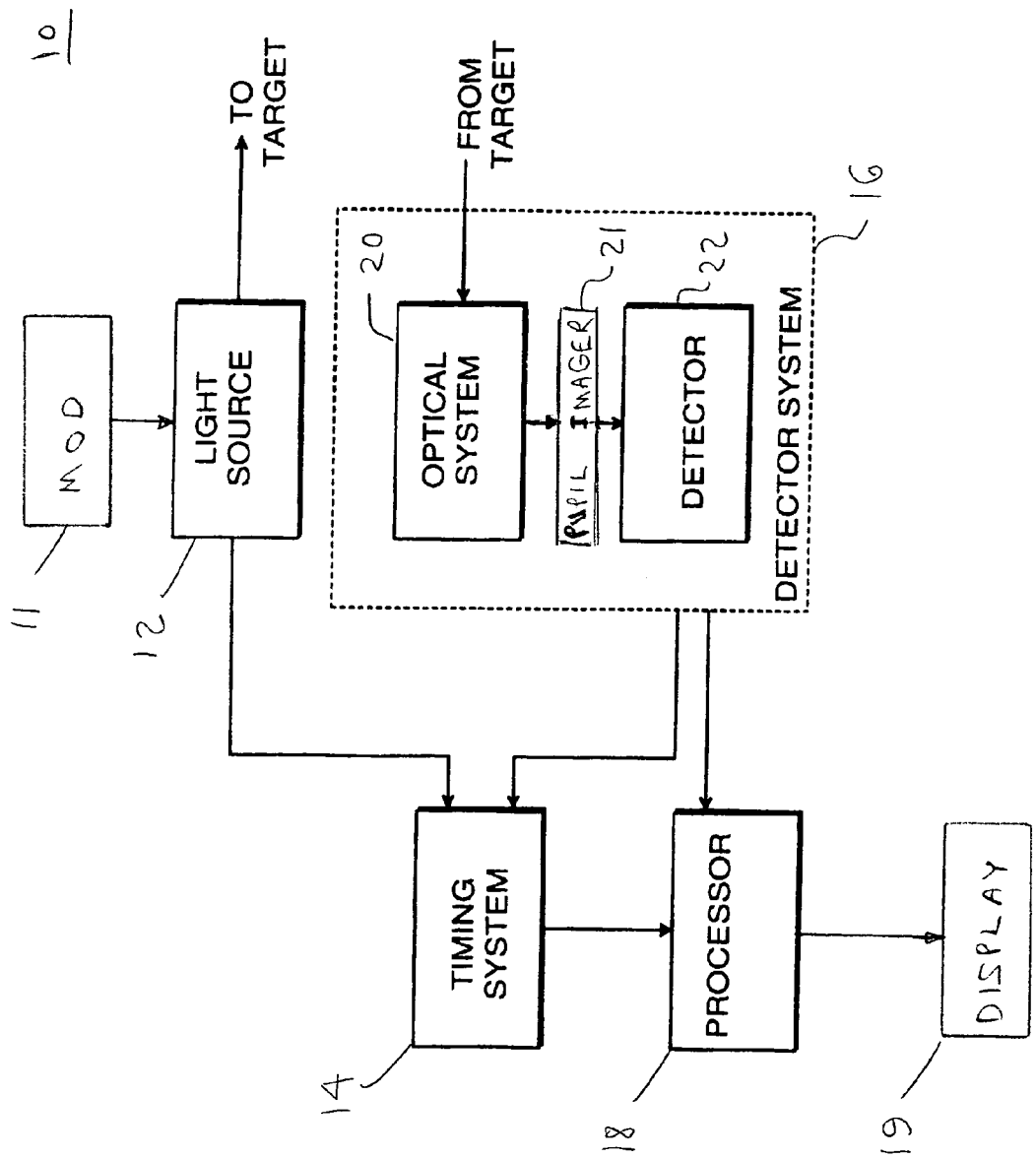
FIG. 1 is a system block diagram of a light wave rangefinder, in accordance with an embodiment of the present invention.

Referring to FIG. 1, an embodiment of laser rangefinder 10, according to the present invention, includes modulator 11, light source 12, timing system 14, processor 18, display 19, and detector system 16. Rangefinder system 10 may be used to image a single object or a plurality of objects located in a target scene. As shown, light source 12 is modulated by modulator 11 to produce pulses of light which are emitted toward the target being imaged. Light source 12 may include a laser. The laser may be a solid state microchip laser which emits pulses of light having a wavelength, for example, approximately equal to 532 nanometers (nm). When modulated, the laser may emit short pulses of light having a duration, for example, approximately equal to 220 picoseconds.

The laser may, of course, be any other laser known in the art for use in laser radar systems. The choice of the laser depends on the particular application. For example, in non-visible applications, such as ultra-violet and infrared applications, different lasers emitting pulses of light having different wavelengths may be used. Light source 12 may be stationary or may be placed on a movable platform, such as an aircraft.

Detector system 16 detects light reflected from the target scene. Detector system 16, as shown, includes optical system 20 and light detector 22. Optical system 20 collects a portion of the light scattered off from the object in the target scene and directs the collected light toward light detector 22. Optical system 20 may include a single or multiple optical lenses. Optical system 20 may also include a combination of lenses and mirrors. The lenses and mirrors are arranged to intercept the light reflected off from the object in the target scene and direct the light toward light detector 22.

As will be explained in greater detail, disposed between optical system 20 and light detector 22 is pupil imager 21. The purpose of pupil imager 21 is to uniformly distribute the target return energy across the entire light detector 22. Although shown as separate components, it will be understood that pupil imager 21 may be part of, or integrated with optical system 20. Although a pupil imager is shown disposed between optical system 20 and detector 22, it will be appreciated that other non-imaging optics may be used. Any non-imaging optics may be used that provides even distribution of energy passing through its aperture and impinging upon detector 22.

After the light from the target is scattered and distributed by pupil imager 21, light detector 22 receives uniformly distributed energy across its entire detector array. Light detector 22 may include a plurality of light detectors, each operated in a non-linear Geiger-mode. Each light detector in the array may be a single avalanche photodiode (APD), which operates in a non-linear Geiger-mode.

Conventional, commercially available APDs may be a silicon APD, which operates in a non-linear Geiger-mode. In order to operate a silicon APD in the non-linear Geiger-mode, the bias voltage of the silicon APD is set above the breakdown voltage of the silicon APD. When the silicon APD absorbs an impinging photon, the silicon APD releases a photoelectron into its conduction band. Successive collisions within the gain region of the silicon APD produces a cascade of electrons.

Silicon APDs may also be operated in a linear mode. When the silicon APD is operated in a non-linear mode, however, the avalanche of electrons quickly saturates and produces a gain that is much greater than the gain produced by a silicon APD operated in a linear mode.

In order to reset the silicon APD, the bias voltage of the silicon APD may be quickly reduced below the breakdown voltage, thereby quenching the avalanche of electrons. Conventional active quenching circuits quickly reduce the bias voltage of the silicon APD to below the breakdown voltage. Non-active quenching circuits may also be used to reduce the bias field of the space-charged electrons produced by the avalanche itself.

In the embodiment shown in FIG. 1, timing system 14 is in communication with light source 12 and detector system 16. The purpose of timing system 14 is to determine the round-trip travel time for each pulse of light emitted from light source 12. The round-trip travel time of a pulse of light is the amount of time between the time light source 12 emits a pulse of light and the time light detector 22 detects light reflected from the target in the scene.

Timing system 14 may include a timer which measures the round-trip travel time. The timer may begin timing a pulse of light, when timing system 14 receives a signal from light source 12 indicating that light source 12 has emitted a pulse of light. Timing system 14 may end timing of the pulse, when timing system 14 receives a signal from detector system 16 indicating that light detector 22 has detected reflected light from the target.

Processor 18 is in communication with timing system 14, detector system 16 and display 19. The processor receives signals from timing system 14, each signal representing the round-trip travel time of each pulse of light impinging upon a corresponding detector in the detector array. Processor 18 may then determine the relative position or range between rangefinder system 10 and the target. Processor 18 may also be configured to determine the absolute position of the target by receiving geodetic information from an inertial navigation system (not shown). As will also be described later, processor 18 may count the photons released as avalanche photoelectrons by each detector in the detector array within narrow range windows. Any range window having the largest photon count may be determined to be the desired range to target.

Figure 2:
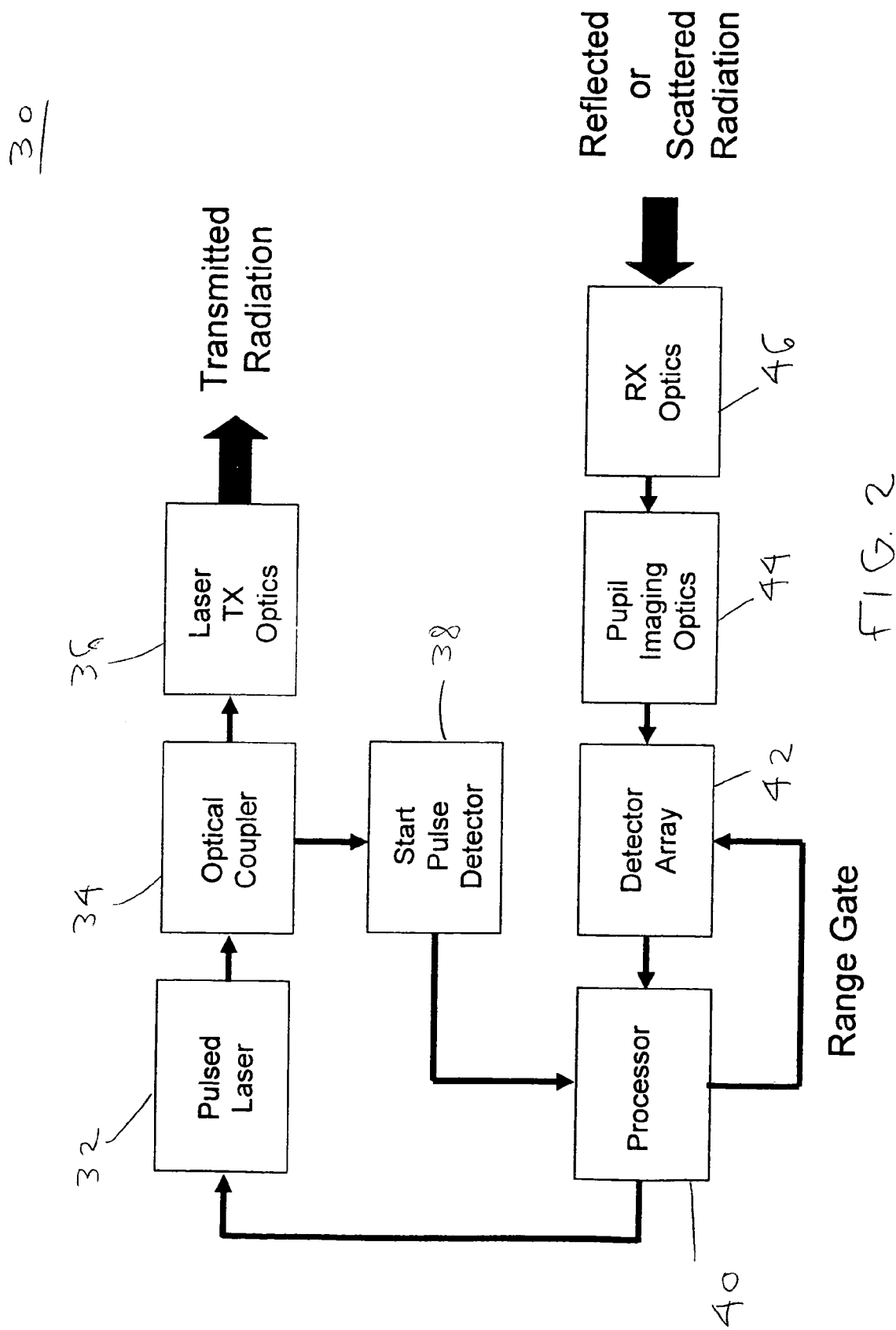
FIG. 2 is another system block diagram of a light wave rangefinder, in accordance with another embodiment of the present invention.

In more detail and referring now to FIG. 2, more detailed block diagram shows an embodiment of a laser rangefinder system 30. As shown, the transmitter portion of rangefinder 30 includes pulsed laser 32, optical coupler 34 and laser transmit optics 36.

The received portion of rangefinder system 30 includes processor 40, detector array 42, pupil imaging optics 44 and receiver optics 46. Also shown is start pulse detector 38 coupled between optical coupler 34 and processor 40.

In the embodiment shown in FIG. 2, rangefinder system 30 does not include a separate modulator for modulating the laser light source. Instead, pulsed laser 32 includes an internal device necessary to modulate the amplitude of the pulses of light generated by the pulsed laser.

Optical coupler 34 detects the leading edge, for example, of a pulse transmitted by pulsed laser 32. The detected leading edge of the transmitted pulse is sent to start pulse detector 38. The start pulse detector provides a control signal to processor 44 to begin its counting.

At the expected pulse return time processor 40 provides a range gate signal to detector array 42. Each detector in detector array 42 is gated ON and OFF with this external bias control signal, or range gate, provided by processor 40. When gated ON, the Geiger-mode APD of the array is individually biased above the breakdown threshold of the device, and when it is gated OFF, the APD is biased below the avalanche breakdown voltage of the device. Processor 40 also provides a control signal, as shown, to pulsed laser 32 to start the transmission of a pulse toward the target.

Each Geiger-mode APD in the array acts as a highly sensitive photon detecting device, which is interfaced to processor 40 to provide a timing flag indicating that an avalanche detection event has occurred in a corresponding detector of the array.

Avalanche events may be caused by (1) a thermally generated electron-hole, or (2) an incident background photon, or (3) a signal photon reflected from the target. Accordingly, a Geiger-mode APD may be subject to being triggered by events other than an intended triggering event of a signal photon reflected from the target.

As will be explained, the Geiger-mode APD is active (gated ON) during a range timing gate whose duration may be determined by the uncertainty in target location. The range gate may be subdivided into a large number of sampling intervals (range bins) whose duration may be given by the precision of the timing electronics.

The range gate is constructed to contain the expected target return signal, whose duration is typically very short (of the order of one nanosecond, for example) compared to the duration of the range gate. Thus, for most of the range gate, each detector in the array is exposed to background photons and thermally generated electron hole pairs (which initiate dark counts) and may undergo an avalanche event from either or both of these causes. Such non-signal avalanche events are common in a highly sensitive Geiger-mode APD. Consequently, statistical processing of the target returns over multiple pulses within the range gate is performed by the present invention to extract the real target range. The statistical processing of these target returns may be performed by processor 40.

If a single Geiger-mode detector experiences an avalanche event, the time of the event may be recorded and the detector is then unavailable until the next range gate is provided by processor 40. There is no way of knowing whether the avalanche event was attributable to signal photons, background photons, or a thermally generated electron-hole pair (dark count), or some combination of these causes.

Since the probability of avalanche increases with total photon number, however, the chance of avalanche is higher when the real return signal is present than when it is not. Consequently, for a stationary or mobile target, the detector's range histogram, determined from multiple pulse measurements, is likely to show a clear maximum at the real target range. Range, therefore, may be determined by multiple pulses separated in time. If the target return signal is weak, however, no clear maximum would exist in the range histogram.

The range to a target may be determined by the present invention with a single, short laser pulse transmitted from laser transmit optics 36, using a gated Geiger-mode APD array, that is gated by the range gate provided from processor 40. Multiple detected pulses, however, are necessary to reduce the range error during measurement. These multiple detected pulses are obtained in the present invention by counting each detector in the array that experiences an avalanche event during a short time interval. In order to accomplish this, the inventors have discovered that the receiver optics must uniformly distribute the target return signal across the detector array. The target return signal is uniformly distributed across the Geiger-mode detector array using a non-imaging optical system, placed in front of detector array 42. Such a non-imaging optical system may be the pupil imaging optics 44 shown in FIG. 2. A pupil imager may be used to project or distribute onto a Geiger-mode array a uniform optical intensity distribution of the received image of the target. The target image is evenly distributed and is, therefore, a non-image projection of the target onto the APD array. Multiple detectors in the array may now experience an avalanche event from a single transmitted pulse.

The probability of avalanche, although small, is higher with the target return signal present than without the target return signal present. Consequently, a histogram of the ranges detected by each detector in the Geiger-mode APD array is expected to show a clear maximum at the target range, even if the target is moving. This single-shot, photon-counting, ranging approach dramatically reduces required average laser transmitter power and produces a highly accurate "snapshot" of the measurement of target range for each transmitted laser pulse. Thus, multiple range measurements are made in a single shot, with photonic sensitivity. Statistical range sampling is, thus, performed in two-dimensional space (across the array) instead of in time, as is conventionally required with a single Geiger-mode detector.

Figure 3:
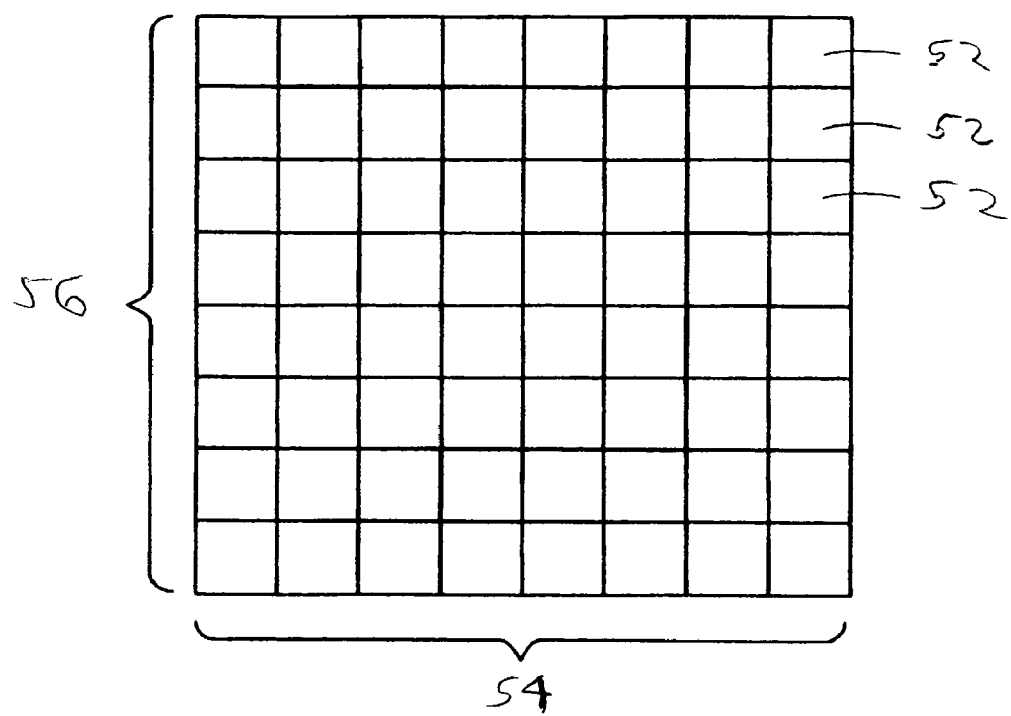
FIG. 3 is a schematic diagram of an exemplary photodetector array used in an embodiment of the present invention.

FIG. 3 shows an embodiment of an array of light detectors 50. The array of light detectors 50 is an 8×8 array of light detectors and includes sixty-four (64) individual light detectors 52 arranged in a square pattern, having eight columns 54 and eight rows 56. In other embodiments, the array of light detectors 50 may be a 2×2 array, a 4×4 array, or any other size array. In other embodiments, the individual light detectors 52 in the array of light detectors 50 may be arranged in a rectangular pattern, a circular pattern or any other pattern.

Figure 4:
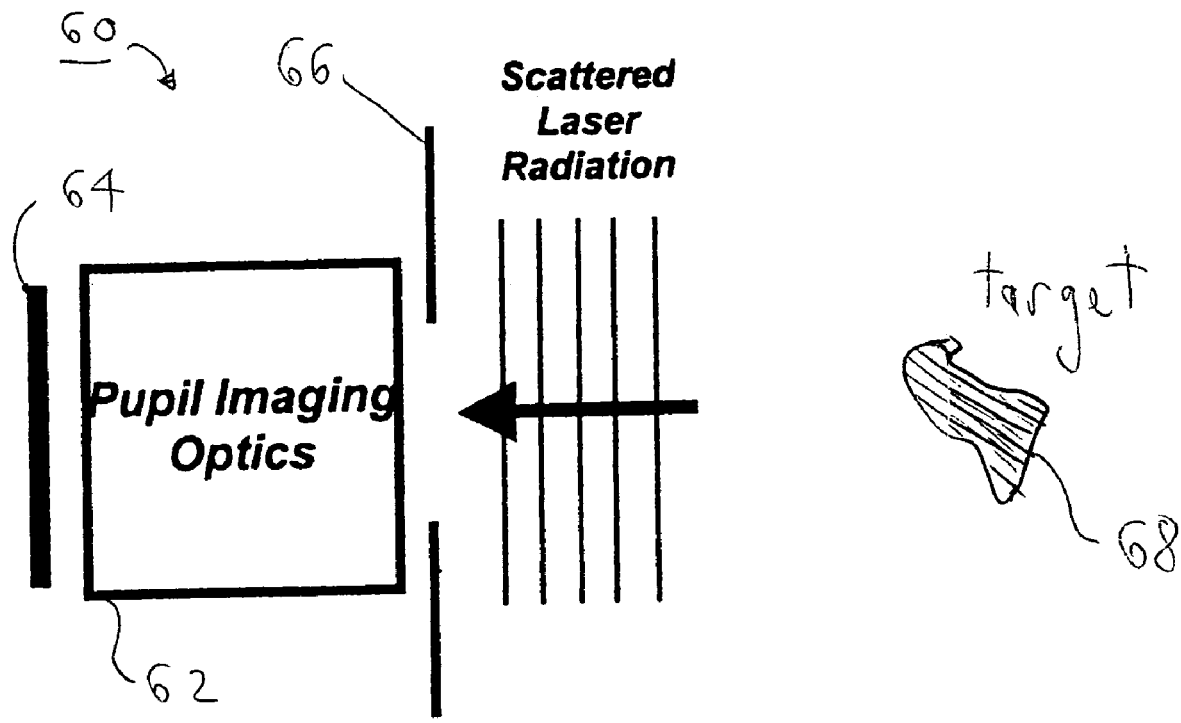
FIG. 4 is a schematic diagram of a portion of a light wave rangefinder, depicting pupil imaging optics disposed between a detector array and a pupil, in accordance with an embodiment of the present invention.

Referring next to FIG. 4, there is shown pupil imaging optics 62 disposed between a Geiger-mode APD detector array 64 and pupil 66 in a receiver portion of laser optical system 60. With the configuration shown in FIG. 4, the range to a target may be determined in a single pulse, with photonic sensitivity, using a Geiger-mode APD detector array in a pupil imaging optical receiver system. Any other non-imaging optical receiver that distributes the target return energy uniformly across the Geiger-mode APD array suffices to achieve multiple range measurements in a single shot. Other constraints, of course, such as field of view, aperture size, and so on, further define the type of non-imaging optical system used. For the purposes of this discussion, Geiger-mode APD array 64 is coupled to pupil imaging optics 62, which evenly distributes the light energy passing through pupil 66, as an embodiment of the invention shown in FIG. 4. The probability of avalanche, although small, is higher with the signal present than without, and consequently, a histogram of the ranges detected by each pixel in the Geiger-mode APD array shows a clear maximum at the real target range.

The present invention advantageously determines range to a distant target using low laser peak pulse energy and low pulse repetition frequency (PRF). Although the laser peak pulse energy may be higher than in a single detector case, the PRF of the laser may remain at relatively low levels and still provide a range update rate sufficient for target tracking, resulting in lower average laser power. When using a Geiger-mode detector array, each range update requires a single pulse. When using a single Geiger-mode detector, multiple pulses and much higher PRF is required to determine a single range update with comparable accuracy.

Figure 5:
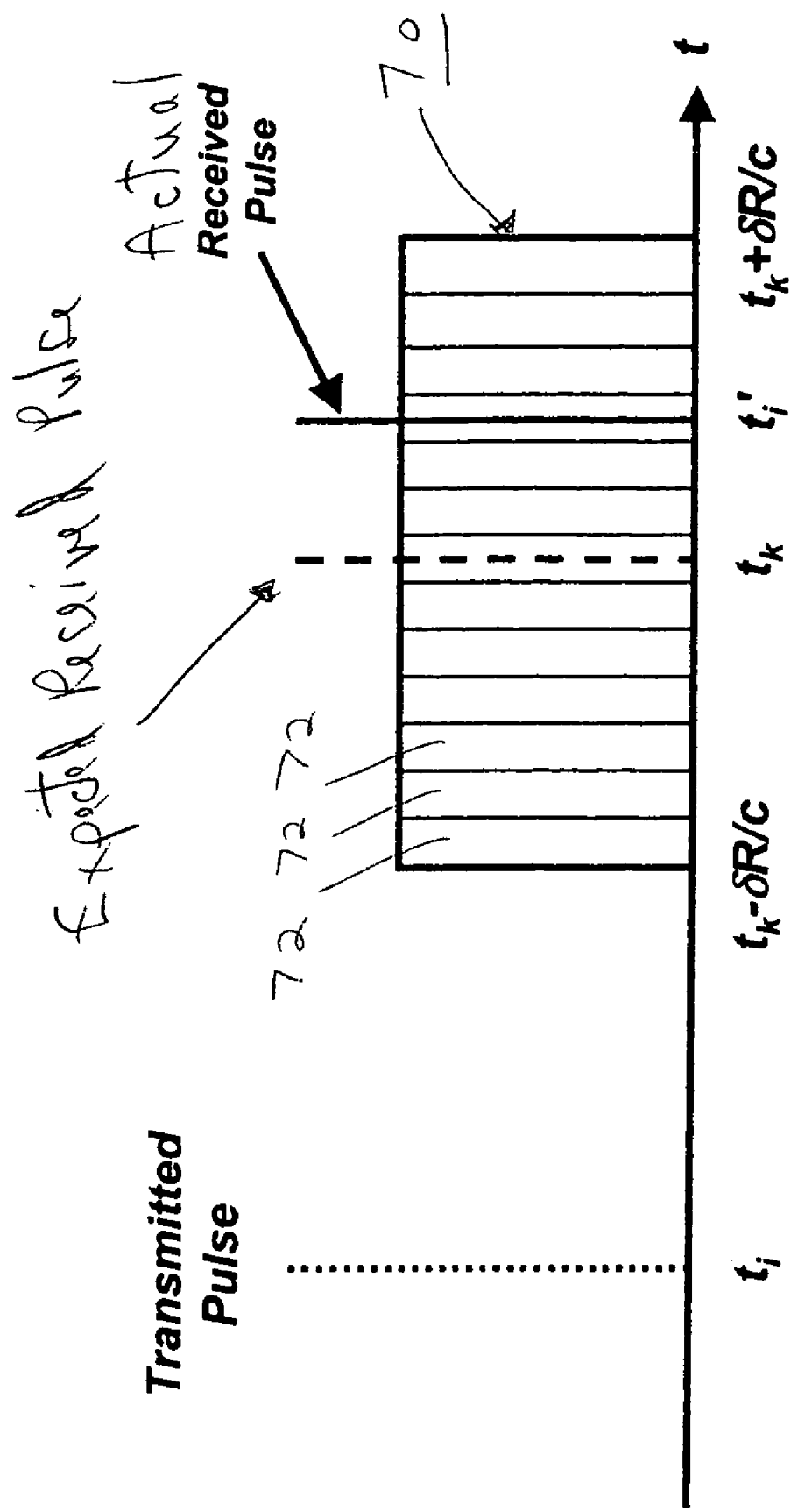
FIG. 5 is a timing diagram depicting a range gate having multiple range bins for receiving a reflected pulse from the target, in accordance with an embodiment of the present invention.

Referring now to FIG. 5, there is shown range gate 70 provided by processor 40 to detector array 42 (FIG. 2). As shown, range gate 70 includes multiple narrow processing windows 72. A pulse is transmitted by laser transmit optics 36 at time $t_i$. The time $t_i$ is the transmit time of the $i^{th}$ laser pulse and $R(t_i)$ is the target range at time $t_i$. The time $t_k$ is the expected, or estimated pulse return time (based on, for example, Kalman filter updates from previous range determinations), and the time ti' is the receive time of the laser radiation scattered by the target.

The measured transmit and receive times may be denoted as ti* and ti'*, respectively. The difference between the actual and measured transmit and receive times may be due to timing jitter and clock frequency instability. The uncertainty in target position is denoted as $\delta R$, as shown in FIG. 5. The scattered laser radiation is detected and the range is measured during a timing window constructed about the expected pulse return time $t_k$ and may be described by $t \epsilon [t_k \delta R/c, t_k + \delta R/c]$.

Figure 6:
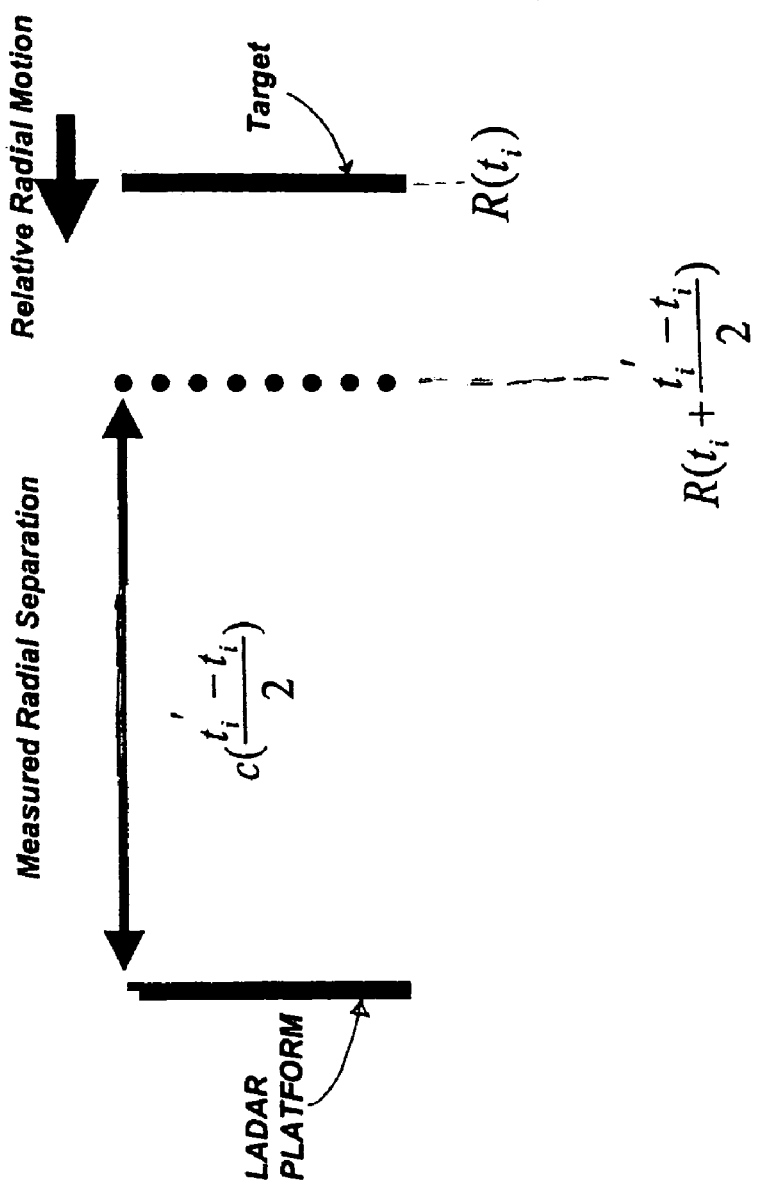
FIG. 6 is a range diagram for use with FIG. 5, depicting a measured radial separation between a LADAR platform, hosting the light wave rangefinder, and a target, in accordance with an embodiment of the present invention.

A timing diagram for the process associated with FIG. 5 is illustrated in FIG. 6. As shown, the target is assumed to be moving toward the LADAR platform (which itself may be moving or stationary). The range R as a function of time $t_i$ [$R(t_i)$] represents the target range at time $t_i$. The following expression also shown in FIG. 6 represents the target range R as a function of time $t_i + \Delta t$, where $\Delta t$ is $(t_i' - t_i)$ divided by two:

$$R\left(t_i + \frac{t_i' - t_i}{2}\right)$$

Each detector in the Geiger-mode APD detector array is interfaced to timing electronics having low timing jitter. The outgoing laser pulse is generated and its transmission time ti* is recorded, after which the Geiger-mode array is gated ON only during the processing window. If a detector in the array achieves avalanche breakdown during the processing window, the avalanche time is recorded for that detector. No further events are recorded for that detector during the processing window.

Figure 7:
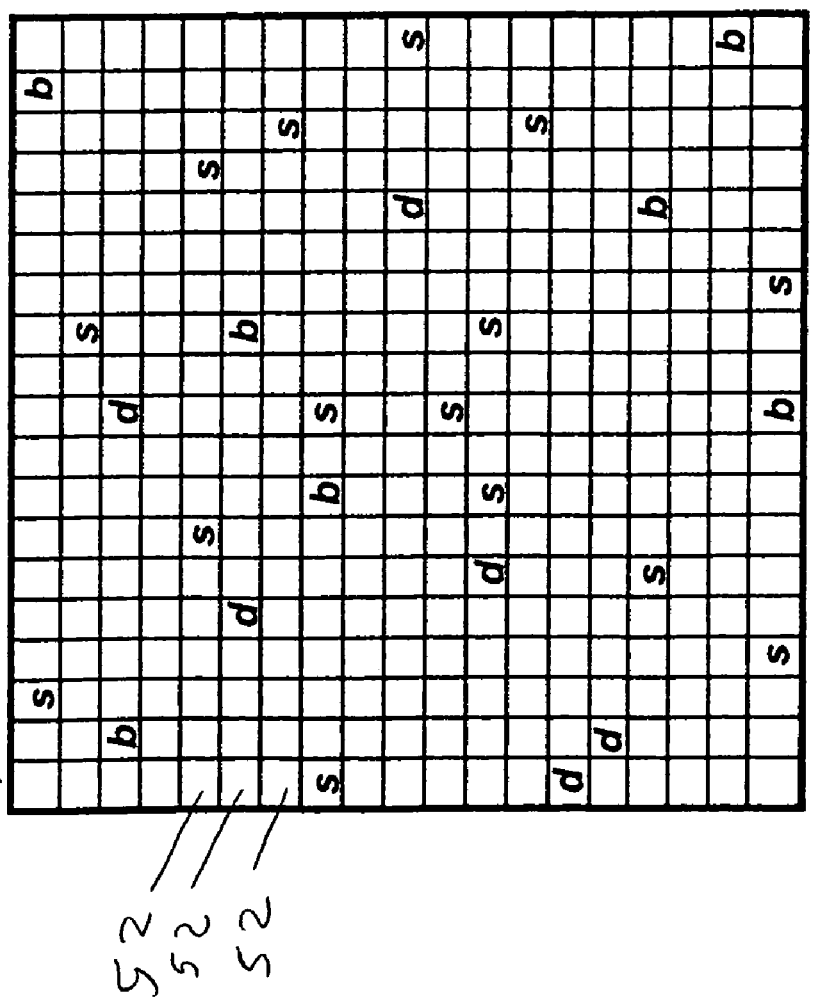
FIG. 7 is a schematic diagram of a Geiger-mode photodetector array showing avalanche events occurring as a result of incident background photons, thermally generated electron hole pairs (dark counts), and signal photons reflected from the target, in accordance with an embodiment of the present invention.

Referring to FIG. 7, detector array 42 includes multiple detectors 52 achieving avalanche breakdowns. An individual avalanche event may have been due to a signal photon, a background photon, or a thermally generated electron-hole pair (a dark noise count), or some combination of these. When the Geiger-mode array is gated OFF at the close of the processing window, the collection of all avalanche event times from all the triggered detectors in the array is equivalent to a collection of ranges, since the measured pulse start time ti* is known.

A Geiger-mode avalanche event is probabilistic with the probability of occurrence increasing with the average number of photons present. The probability of avalanche with the signal present, therefore, is higher than without the signal present. Accordingly, a histogram of the equivalent ranges detected by the Geiger-mode detector array may show a clear maximum at the target range. A typical range histogram is shown in FIG. 8, in which the target range is 1000 meters and the uncertainty in target range is ±100 meters. As shown, the maximum count of 12 (for example) is achieved at 1000 meters.

An exemplary pupil imager is shown in FIG. 9A. As shown, object 90 is viewed by fore optics or telescope 92 (for example). The structure of object 90 may also be viewed at field stop 94 as image 90a (shown in FIG. 9B). Image 90a is inverted at the field stop. It will be appreciated that a detector array located at field stop 94 would preserve the structure of object 90 as image 90a.

The present invention, however, places the detector array at exit pupil 98. Field lens 96 spreads the energy from the field points of field stop 94 uniformly over the detector array located at exit pupil 98. The structure of object 90 is not visible at the detector array. Instead, field lens 96 is effective in evenly distributing the energy received from field stop 94 at the detector array located at exit pupil 98. This evenly distributed energy at the exit pupil is designated 98a in FIG. 9C.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A light wave rangefinder comprising:
a light transmitting optical system for directing a laser pulse at a target,
a light receiving optical system for receiving reflected light from the target, including a Geiger-mode avalanche photodiode (APD) array, and a non-imaging optical device,
the non-imaging optical device positioned between the received reflected light and the APD array, and configured to uniformly distribute the received reflected light across the APD array, and
the APD array uniformly illuminated by the received reflected laser pulse, producing a plurality of Geiger-mode avalanche events, and
a processor for determining range to the target based on the plurality of the Geiger-mode avalanche events.

2. The rangefinder of claim 1 wherein
the non-imaging optical device is a pupil imager.

3. The rangefinder of claim 1 wherein
the light transmitting optical system directs a single, short laser pulse at the target, and
the plurality of Geiger-mode avalanche events is produced by the single, short laser pulse.

4. The rangefinder of claim 1 wherein
the processor provides a range timing gate for biasing ON the APD array, and
a detector in the APD array achieves avalanche breakdown at a time t, and
the processor records the time t.

5. The rangefinder of claim 1 wherein
the APD array includes a plurality of detectors, each detector interfaced to a timer for recording a transmission time and a reception time,
the transmission time triggered by the directed laser pulse, and
the reception time triggered by each detector achieving avalanche breakdown.

6. The rangefinder of claim 5 wherein
the processor is configured to bias each detector ON, after the transmission time, and configured to determine range to the target, in response to a respective reception time triggered by each detector achieving avalanche breakdown, after the respective detector is biased ON.

7. The rangefinder of claim 5 wherein
the processor includes a counter for counting all avalanche breakdowns triggered by the plurality of detectors, and
a collection of all the avalanche breakdowns is a collection of ranges, each range timed from the transmission time triggered by the directed laser pulse.

8. The rangefinder of claim 5 wherein
the processor includes a range timing gate, the range timing gate comprised of a plurality of range bins,
the processor is configured to place a respective avalanche event triggered by a respective detector achieving avalanche breakdown into one of the plurality of range bins, and
a range bin having a majority of the triggered avalanche events determines the range to the target.

9. The rangefinder of claim 1 wherein
the processor provides a range timing gate for biasing ON each detector of the APD array, and
the range timing gate is constructed about an expected received reflected laser pulse.

10. The rangefinder of claim 9 wherein
the processor includes a counter for counting all avalanche events including avalanche events due to at least one of a signal photon, a background photon and a thermally generated electron-hole pair.

11. The rangefinder of claim 10 wherein
the processor is configured to provide a histogram of target ranges within the range timing gate, the histogram being count values of avalanche events as a function of target range, and
a target range having a maximum count value is determined to be the range to the target.

12. A light wave rangefinder comprising:
transmitting means for directing a laser pulse at a target,
receiving means for receiving reflected light from the target,
non-imaging means for uniformly illuminating light provided from the receiving means,
detecting means for detecting the uniformly illuminated light provided from the non-imaging means,
counting means for counting multiple detections occurring in the detecting means during a timing window, and
processing means for determining range to the target based on the multiple detections occurring during the timing window.

13. The light wave rangefinder of claim 12 wherein
the detecting means includes a Geiger-mode avalanche photodiode (APD) array.

14. The light wave rangefinder of claim 12 wherein
the non-imaging means includes a pupil imager.

15. The light wave rangefinder of claim 12 wherein
the counting means includes separating means for dividing the timing window into multiple range bins and separately counting detections occurring in each range bin of the multiple range bins, and
the processing means includes a selector for selecting a range bin of the multiple range bins having a maximum count value, and using results of the selector to determine range to the target.

16. A method of determining range to a target comprising the steps of:

a) transmitting a laser pulse toward a target;
b) receiving reflected light from the target;
c) uniformly illuminating reflected light received in step (b) using a non-imaging optical device;
d) detecting the uniformly illuminated light of step (c) using a Geiger-mode avalanche photodiode (APD) array;
e) counting avalanche events produced by a plurality of detectors in the APD array; and
f) determining range to the target based on counting avalanche events in step (e).

17. The method of claim 16 wherein
step (c) includes uniformly illuminating the reflected light using a pupil imager.

18. The method of claim 16 including the step of:
dividing a range gate into multiple range bins; and
step (d) includes detecting the uniformly illuminated light occurring within the range gate;
step (e) includes separately counting the avalanche events occurring in each range bin of the multiple range bins; and step (f) includes determining range to the target based on a range bin having the greatest number of counted avalanche events among the multiple range bins.

19. The method of claim 16 wherein
step (d) includes gating ON each detector in the APD array during an approximate expected received time of the reflected light from the target; and
step (e) includes counting the avalanche events produced by the plurality of detectors during the gating ON of each detector.

20. The method of claim 16 wherein
step (a) includes transmitting a single, short laser pulse toward the target; and
step (e) includes counting the avalanche events produced by the single, short laser pulse transmitted toward the target.

* * * * *